Nov. 10, 1936.   S. D. BUTTERWORTH   2,060,027
CAR LOADING DEVICE
Filed Nov. 21, 1934
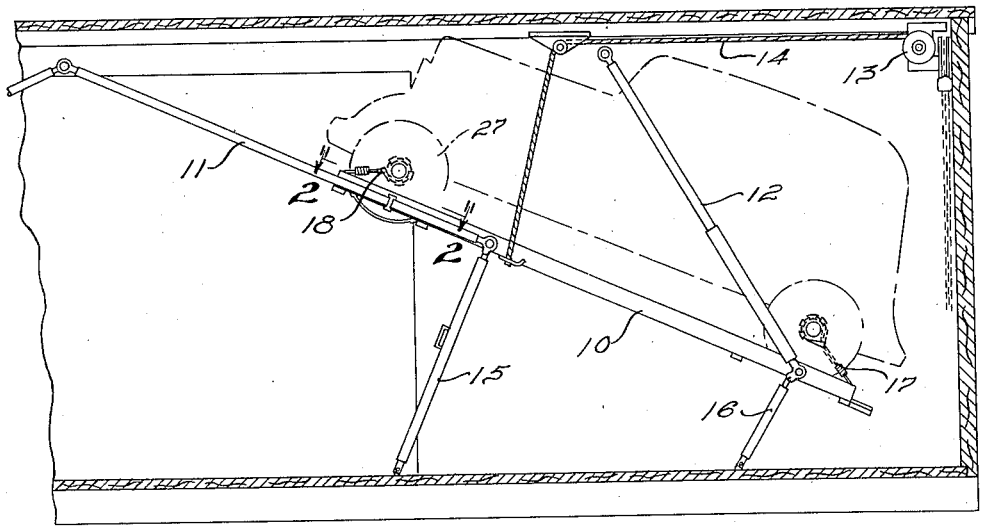
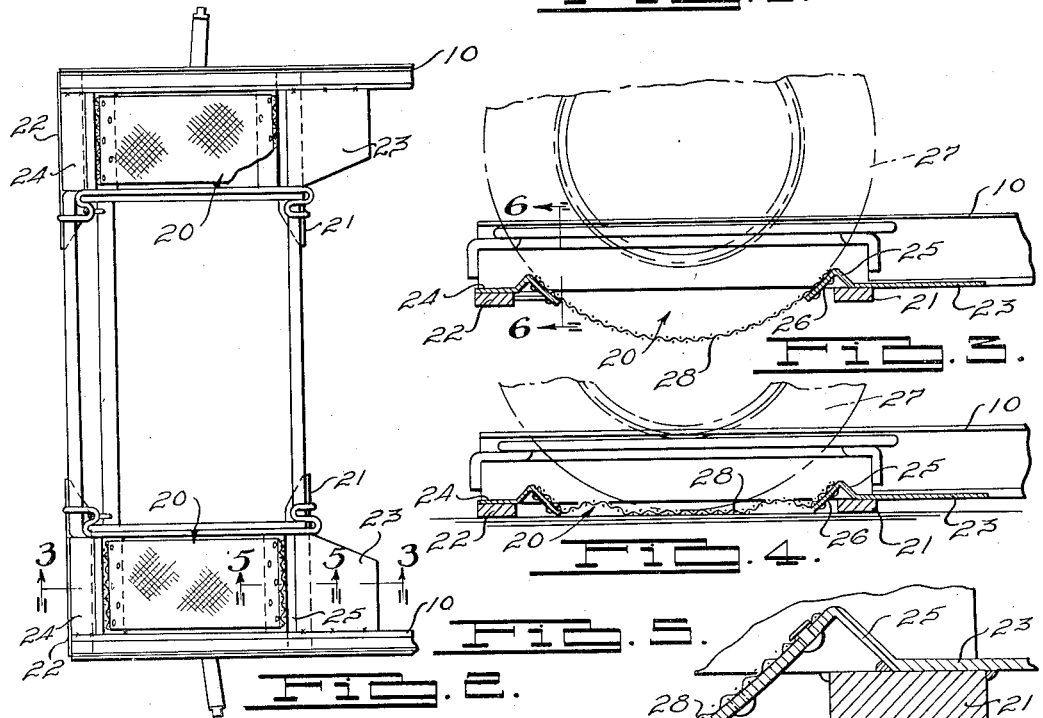
INVENTOR.
Samuel D. Butterworth
BY
Harness, Dickey, Pierce & Hann.
ATTORNEYS.

Patented Nov. 10, 1936

2,060,027

UNITED STATES PATENT OFFICE 2,060,027

CAR LOADING DEVICE

Samuel D. Butterworth, Detroit, Mich., assignor of ninety-nine percent to The Worth Company, a corporation of Michigan Application November 21, 1934, Serial No. 754,017

10 Claims. (Cl. 105—368)

The invention relates to car loading devices and it has particular relation to a device for loading automobiles in freight cars.

Particularly the invention involves an improvement in a car loading device such as disclosed in the co-pending application for patent of Samuel D. Butterworth, Serial No. 646,830, filed December 12, 1932.

In said co-pending application for patent a car loading device is disclosed which includes a frame for supporting the automobile and which is adapted to be elevated from the floor to a semi-decking position. When the frame is on the floor the automobile is rolled into position thereon and then elevated with the frame into the semi-decking position, but it will be appreciated that the semi-decking position depends upon the distance that the automobile can move upwardly without causing it to engage the roof or to be so close to the roof that it might engage the latter during transportation. It will be apparent that the position of the semi-decked automobile also is a governing factor in the positioning of automobiles on the floor between the decked automobiles at the end and if the decked automobiles can be moved upwardly further, less difficulty is encountered in locating the intermediate automobiles.

One object of the present invention is to provide a frame for supporting the semi-decked automobiles, which will enable moving the decked automobiles a little farther upwardly so as to provide more room for the automobiles on the floor.

Another object of the invention is to provide a frame for supporting the semi-decked automobiles which will enable dropping of the automobile at one end so that the latter will be spaced farther from the roof, without interfering with positioning of the automobiles on the floor.

Other objects of the invention will become apparent from the following specification, the drawing relating thereto and from the claims hereinafter set forth.

For a better understanding of the invention reference may be had to the drawing which illustrates one form of the invention, wherein:

Figure 1 is a longitudinal and cross-sectional view of a freight car illustrating a decking frame constructed according to one form of the invention and also illustrating the manner in which the automobile is supported thereon.

Fig. 2 is a cross-sectional view on a larger scale taken substantially on the line 2—2 of Fig. 1.

Fig. 3 is a cross-sectional view on a larger scale taken substantially along the line 3—3 of Fig. 2.

Fig. 4 is a view similar to Fig. 3 but illustrating the relation of the wheel to the frame when the latter is on the floor of the freight car.

Fig. 5 is a cross-sectional view on a larger scale taken substantially along the line 5—5 of Fig. 2.

Fig. 6 is a cross-sectional view taken substantially along the line 6—6 of Fig. 3.

Referring to Fig. 1, the frame of the loading device is indicated at 10 and is pivotally connected to upper parts of the freight car by means of forward rods 11 and rearward telescopic rods 12. A hoisting device 13 including cables 14 which are connected to the frame 10, is employed for elevating the frame. When the frame is in its semi-decking position, supporting rods 15 and 16 connect the frame to lower parts of the car. Chain anchoring devices 17 and 18 may be employed for anchoring the automobile on the frame so as to prevent its movement when in a semi-decking position. The construction of the frame and associated parts in general is disclosed and described in the co-pending application previously identified and for that reason it does not seem necessary here to set forth a detailed construction.

In the present invention, and as shown by the other figures, the front end of the frame is provided with openings 20 at opposite corners and these openings are adapted to receive the front wheels of the automobile. As best shown by Fig. 3, cross braces 21 and 22 at opposite ends of the opening 20 have plate elements 23 and 24 secured thereto respectively, and each of these plate elements adjacent the opening 20 is turned upwardly as indicated at 25 and then downwardly into the opening as indicated at 26 so as to provide a short inclined support for each side of a wheel indicated in broken lines at 27. A flexible strap 28 is secured at its ends to the downwardly turned portion 26 and this strap is loosely arranged so that with the frame in raised position, the wheel may project downwardly into the opening 20 before the strap provides a support for the bottom portion of the wheel. The strap may be constructed of strong canvas for example, or any suitable material, the adaptability of which will be readily apparent.

When it is desired to mount an automobile on the frame, the latter is on the floor as illustrated by Fig. 4 and when it is in this position the flexible strap 28 between the plate portions 26 on the frame lies loosely on the floor. The automobile may then be rolled lengthwise over the frame until the front wheels are disposed over the opening 20 where they will be supported directly by the floor, although it will be apparent that they rest on the straps. While the portions 25 on the plates 23 provide slight obstacles to rolling of the wheels into position, this is practically negligible and in fact such upturned portions could be eliminated. They are desirable in that they increase the strength of the plate portions which support the car without causing such plate portions to project below the frame where they would engage the floor when the frame is on the latter. Now as the frame is elevated the front wheels naturally move downwardly into the openings, or in other words the wheels will remain supported by the floor until the frame moves upwardly a sufficient amount that the plate portions 26 and the flexible straps 28 will act as a support for the wheels and lift them with the frame. When the frame is so elevated, it will be noted that the wheels project downwardly below the frame an appreciable distance. Preferably the front wheels of the automobile will not be fastened to the frame until the latter is elevated slightly and sufficiently to position the wheels as shown by Fig. 3 and then the chains may be employed for positively anchoring the automobile on the frame. It should be appreciated, however, that the position of the front wheels and the plate portions 26 engaging opposite sides thereof, will also serve to anchor the wheels and as a matter of fact chain devices at the front end of the automobile could be eliminated.

When the frame is in a semi-decking position, the front end of the automobile is lower than the rear end thereof, with respect to the frame, and this causes the front end of the automobile to be spaced farther from the roof thereby eliminating any danger of the automobile engaging the roof. Furthermore, this arrangement will enable lifting the automobile farther upwardly if this should be desired without causing the front end to engage the roof and this in turn provides a greater space below the frame for accommodating additional automobiles.

The same construction shown and described in connection with the front end of the frame for supporting the front wheels of the automobile might also be used for supporting the rear end of the automobile and the wheels thereon if this should be found desirable. Ordinarily, however, the difficulties encountered in semi-decking the automobiles results from the limited space for accommodating the front end of the automobile as raising this end of the automobile introduces the greatest difficulty because of its proximity to the roof. The present invention is peculiarly important in this respect, and furthermore because it does not introduce any appreciable difficulty in rolling the automobile on the frame.

Although only one form of the invention has been illustrated and described in detail, it will be apparent to those skilled in the art that various modifications may be made without departing from the scope of the appended claims.

What I claim is:

1. In a car loading device, a frame adapted to support an automobile in elevated position and to be laid on a floor for receiving the wheels of the automobile, said frame at one end having openings at its corners for allowing the wheels of the automobile to partially project therethrough, and flexible means connected to the frame and loosely extending across said opening, whereby when the frame is elevated the wheels may move downwardly into the openings and into supported engagement with the flexible means.

2. In a car loading device, a frame adapted to support an automobile in elevated position through the wheels thereof and to be laid on a floor for receiving the wheels of the automobile, means on the frame for allowing one end of the automobile to move downwardly a limited amount relative to the frame, and means for holding the automobile in position on the frame.

3. In a car loading device, a frame adapted to support an automobile in elevated postion and to be laid on a floor for receiving the wheels of the automobile, said frame at one end having openings at its corners for allowing the wheels of the automobile to project therethrough, and means on the frame for permitting said wheels to move downwardly through the openings a limited amount when the frame is elevated and for supporting the wheels after such movement.

4. In a car loading device a frame adapted to support an automobile in elevated position through the wheels thereof and to be laid on a floor for receiving the wheels of the automobile, means for allowing the frame to be raised from the floor a limited amount before it begins to raise one end of the automobile, and means on the frame for positively supporting and lifting said end of the automobile during further raising of the frame.

5. In a car loading device, a frame adapted to support an automobile in elevated position through the wheels thereof and to be laid on a floor for receiving the wheels of the automobile, and means for allowing the wheels at one end of the automobile to move a limited amount downwardly relative to the frame when the latter is raised from the floor.

6. In a car loading device, a frame adapted to support an automobile in elevated position and to be laid on a floor for receiving the wheels of the automobile, said frame at one end having openings at its corners for receiving the wheels of the automobile, downwardly tapered members at the ends of the openings for engaging the sides of the wheels, and flexible means connected to the frame and extending across the openings for supporting the bottom portions of the wheels between said tapered members.

7. In a car loading device, a frame adapted to support an automobile in elevated position through the wheels thereof and to be laid on a floor for receiving the wheels of the automobile, means on the frame for allowing the wheels on one end of the automobile to project partly below the frame when the latter is in elevated position, and means for holding the automobile on the frame.

8. In a car loading device, a frame for supporting an automobile in elevated position through the wheels thereof and disposed to be laid on the floor to receive the automobile, means adapting the frame to allow one end of the automobile to move downwardly a limited amount relative to the frame as the frame is elevated, and means for holding the automobile in position on the frame.

9. In a car loading device, a frame adapted to support an automobile in elevated position and to be laid on a floor for receiving the wheels of the automobile, said frame at one end having openings at its corners for allowing the wheels of the automobile to project therethrough, and means on the frame for permitting said wheels to move downwardly through the openings a limited amount when the frame is elevated and for supporting the automobile after such movement.

10. In a car loading device, a frame adapted to support an automobile in elevated position, said frame having side members spaced apart a sufficient distance to receive the wheels of the automobile when the frame is laid on a floor, each of said side members having an opening at one end for allowing the wheels of the automobile to project therethrough, and means on the frame for permitting said wheels to move downwardly through the openings a limited amount when the frame is elevated and for supporting the automobile after such movement.

SAMUEL D. BUTTERWORTH.